(12) United States Patent
Henson, II

(10) Patent No.: US 12,729,516 B2
(45) Date of Patent: Sep. 8, 2026

(54) HOLDING DEVICE FOR A WORK VEHICLE ATTACHMENT

(71) Applicant: Deere & Company, Moline, IL (US)

(72) Inventor: Walter R. Henson, II, Dubuque, IA (US)

(73) Assignee: Deere & Company, Moline, IL (US)

( * ) Notice: Subject to any disclaimer, the term of this patent is extended or adjusted under 35 U.S.C. 154(b) by 71 days.

(21) Appl. No.: 18/968,551

(22) Filed: Dec. 4, 2024

(65) Prior Publication Data

US 2026/0152929 A1 Jun. 4, 2026

(51) Int. Cl.

| | |
|---|---|
| ***E02F 9/26*** | (2006.01) |
| ***E02F 3/815*** | (2006.01) |
| ***E02F 3/84*** | (2006.01) |
| ***F16B 1/00*** | (2006.01) |

(52) U.S. Cl.

CPC .............. *E02F 9/265* (2013.01); *E02F 3/815* (2013.01); *E02F 3/844* (2013.01); *F16B 1/00* (2013.01); *F16B 2200/83* (2023.08)

(58) Field of Classification Search

None

See application file for complete search history.

(56) References Cited

U.S. PATENT DOCUMENTS

| | | | | |
|---|---|---|---|---|
| 8,145,391 | B2 * | 3/2012 | Omelchenko | E02F 3/847 701/50 |
| 2009/0069987 | A1 * | 3/2009 | Omelchenko | E02F 9/2045 701/50 |
| 2018/0340315 | A1 * | 11/2018 | Metzger | E02F 3/845 |
| 2022/0364322 | A1 * | 11/2022 | Boss | E02F 3/437 |
| 2022/0364334 | A1 * | 11/2022 | Nicholls | E02F 9/264 |

* cited by examiner

*Primary Examiner* — Peter D Nolan
*Assistant Examiner* — Michael F Whalen

(57) ABSTRACT

A method for calibrating a grade control reading of an attachment of a work vehicle operating on a worksite to a rover reading of a rover. The method comprises coupling a holding device to a rover pole coupled to the rover. The holding device has a rover pole receiving portion configured to receive the rover pole, a facing portion, and a bottom portion. The facing portion is positioned on a front or rear of the attachment and the bottom portion is positioned on a bottom of the attachment. The grade control reading is compared to the rover reading. A corrected reading is provided to the work vehicle if the grade control reading and the rover reading are irreconcilable. The corrected reading is configured to reconcile the grade control reading to the rover reading. The work vehicle is operated at the worksite.

20 Claims, 7 Drawing Sheets

FIG. 7

HOLDING DEVICE FOR A WORK VEHICLE ATTACHMENT

TECHNICAL FIELD

The present disclosure relates generally to a work vehicle with an attachment and a holding device for coupling a rover pole to the attachment.

BACKGROUND

Many work vehicles and attachments are compatible with grade control. The grade control may be calibrated with a rover that needs positioned relative to the attachment. This often requires a work vehicle operator and another person to position the rover.

To position a rover coupled to a rover pole relative to a blade, the tip of the rover pole is often positioned on a bottom edge of the blade. The rover pole must be securely positioned and not move during measurements. This is used as a reference point for grade control to accurately measure the blade's elevation and position relative to the desired grade. Essentially, the rover pole acts as a physical marker for the grade control to track and adjust the blade accordingly. Grade control will use the information from the rover to calculate the blade's position and adjust it to match the desired grade.

SUMMARY

A method for calibrating a grade control reading of an attachment of a work vehicle operating on a worksite to a rover reading of a rover at the worksite is disclosed. The method comprises coupling a holding device to a rover pole coupled to the rover. The holding device has a rover pole receiving portion configured to receive the rover pole, a facing portion, and a bottom portion. The facing portion is positioned on a front or rear of the attachment and the bottom portion is positioned on a bottom of the attachment. The holding device is secured to the attachment. The grade control reading is compared to the rover reading. A corrected reading is generated if the grade control reading and the rover reading are irreconcilable. The corrected reading is configured to reconcile the grade control reading to the rover reading. The work vehicle is operated at the worksite with the grade control reading configured to accurately calculate a position of the attachment relative to a desired grade of the worksite.

A work vehicle for operating on a worksite having grade control configured to be calibrated using a rover is disclosed. The work vehicle comprises a frame supported by a plurality of ground-engaging units. The ground-engaging units are configured to support the frame on a surface of the worksite. An attachment coupler is coupled to the frame. The attachment coupler is movable relative to the frame by an attachment actuator. An attachment is coupled to the attachment coupler. A global positioning system is coupled to the work vehicle. The global positioning system is configured for generating a position signal indicative of an attachment position. A controller is communicatively coupled to the attachment actuator and the global positioning system. The controller comprises a data storage device and an electronic data processor. The data storage device is configured for storing instructions that are executable by the electronic data processor to cause the electronic data processor to receive the position signal, generate a grade control reading, and receive a rover reading from a rover coupled to a rover pole that is secured to the attachment with a holding device, the holding device having a rover pole receiving portion configured to receive the rover pole, a facing portion positioned on a front or rear of the attachment, and a bottom portion positioned on a bottom portion of the attachment, compare the grade control reading to the rover reading, provide a corrected reading to the work vehicle if the grade control reading and the rover reading are irreconcilable, the corrected reading configured to reconcile the grade control reading with the rover reading, and control the attachment actuator at the worksite with the grade control reading configured to accurately calculate a position of the attachment relative to a desired grade of the worksite.

A holding device is disclosed. The holding device is for holding a rover pole coupled to a rover that provides a rover reading for calibrating a grade control reading indicative of an attachment position of an attachment of a work vehicle operating on a worksite, the holding device comprises a rover pole receiving portion configured to receive the rover pole, a facing portion positioned on a front or rear of the attachment, and a bottom portion positioned on a bottom portion of the attachment. The holding device configured to secure the rover pole to the attachment.

Other features and aspects will become apparent by consideration of the detailed description, claims, and accompanying drawings.

BRIEF DESCRIPTION OF THE DRAWINGS

The detailed description of the drawings refers to the accompanying figures.

FIG. 7 is a flow chart of a method for calibrating a grade control reading.

Like reference numerals are used to indicate like elements throughout the several figures.

DETAILED DESCRIPTION

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
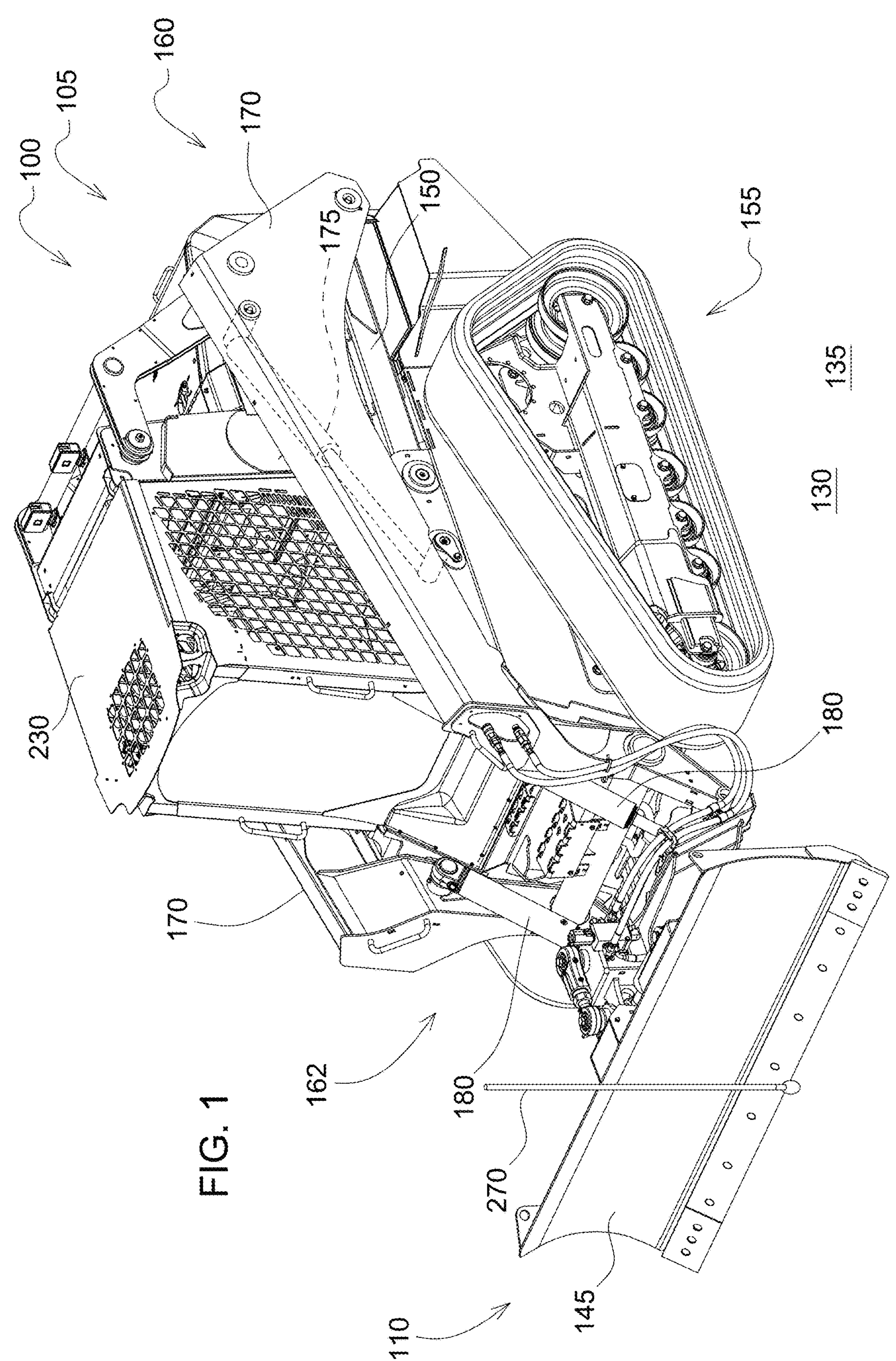
FIG. 1 is a perspective view of a work vehicle including an attachment according to one embodiment.
Figure 2:
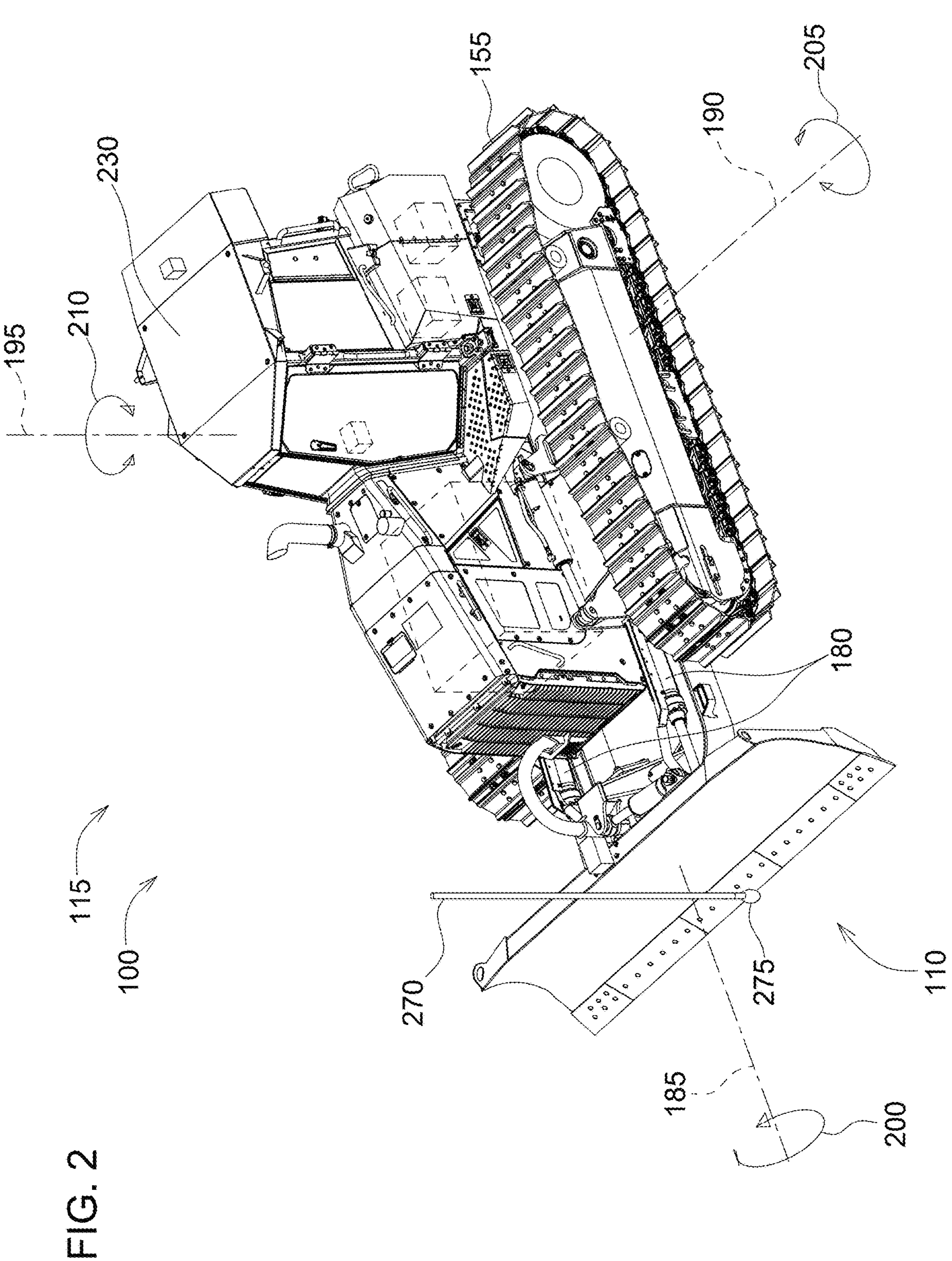
FIG. 2 is a perspective view of a work vehicle according to another embodiment.
Figure 3:
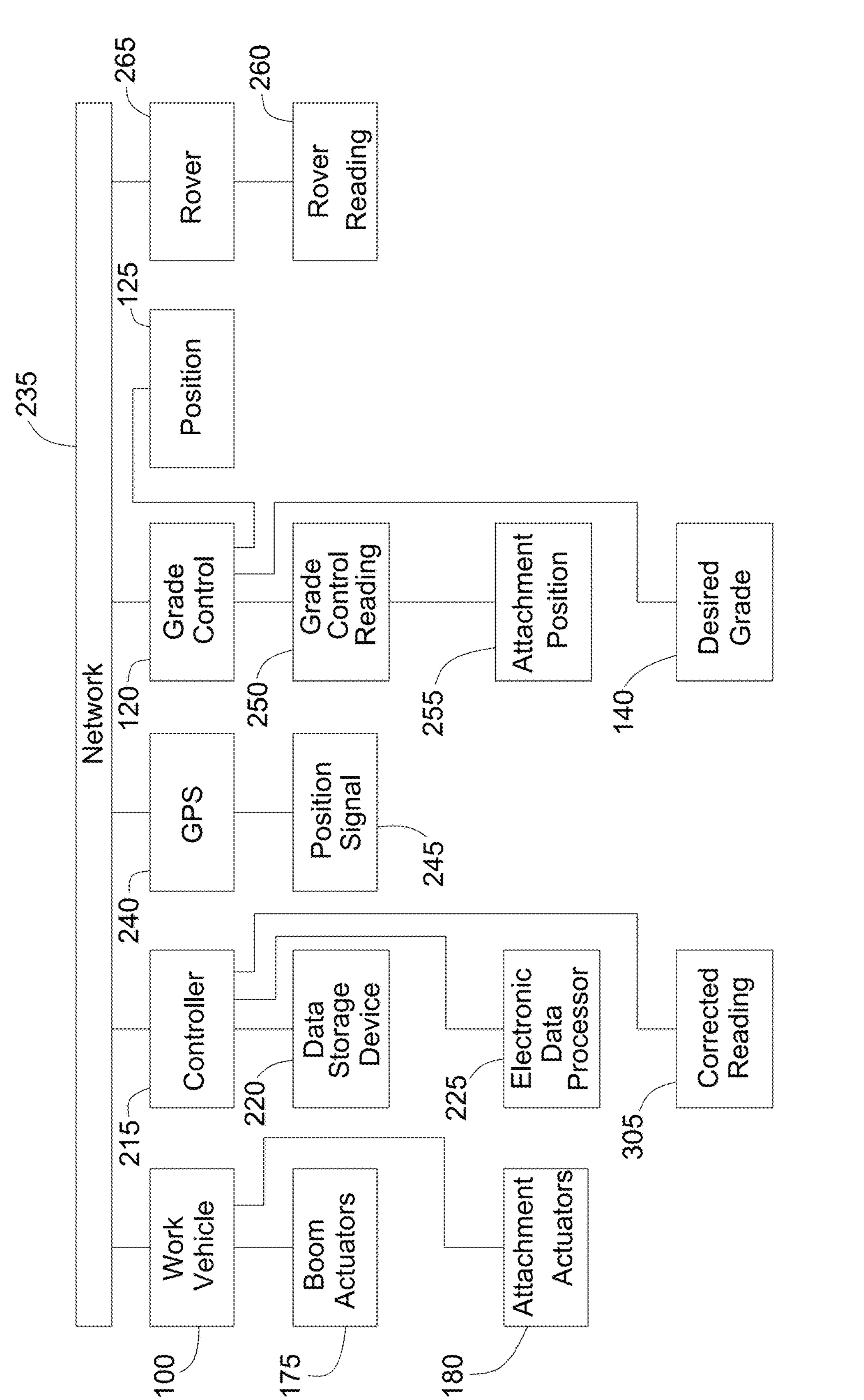
FIG. 3 is a schematic of a work vehicle.

FIG. 1 illustrates a work vehicle 100 depicted as a compact track loader 105 with an attachment 110 operatively coupled to the work vehicle 100. It should be understood, however, that the work vehicle 100 could be one of many work vehicles 100, including, and without limitation, a skid steer, a crawler 115 (FIG. 2), and other construction and road building equipment that use an attachment 110 and a grade control 120 (FIG. 3) to control a position 125 (FIG. 3) of the attachment 110 relative to a surface 130 of a worksite 135 to achieve a desired grade 140 (FIG. 3). The attachment 110 may comprise a blade 145, a bucket, or other attachments 110.

The work vehicle 100 shown has a frame 150 with ground-engaging units 155 configured to support the frame 150 on the surface 130. The illustrated ground-engaging units 155 comprise tracks, but other embodiments can include wheels that engage the surface 130. As used herein, directions with regard to the work vehicle 100 may be referred to from the perspective of facing towards the attachment 110 from the frame 150 of the work vehicle 100.

The work vehicle 100 may comprise a boom assembly 160 pivotally coupled to the frame 150. The attachment 110 may be pivotally coupled at a forward portion 162 of the boom assembly 160. The attachment 110 may be coupled to the boom assembly 160 through an attachment coupler 165 (FIG. 4), such as Deere and Company's Quik-Tach, which is an industry standard coupler configuration universally applicable to many Deere attachments and several after-market attachments.

The boom assembly 160 comprises of a pair of boom arms 170 pivotally coupled to the frame 150 and moveable relative to the frame 150 by a pair of boom actuators 175. The attachment coupler 165 is coupled to a distal portion of the pair of boom arms 170 and is moveable relative to the frame 150 by a pair of attachment actuators 180. For this embodiment, each of the pair of boom actuators 175 and the pair of attachment actuators 180 may be double acting hydraulic cylinders. As such, each may exert a force in the extending or retracting direction, directing pressurized hydraulic fluid into a head chamber of the cylinder to exert a force in the extending direction. Whereas, directing pressurized hydraulic fluid into a rod chamber of the hydraulic cylinder will tend to exert a force in the retracting direction. Alternatively, the pair of boom actuators 175 and the pair of attachment actuators 180 may be electric or pneumatic.

Figure 4:
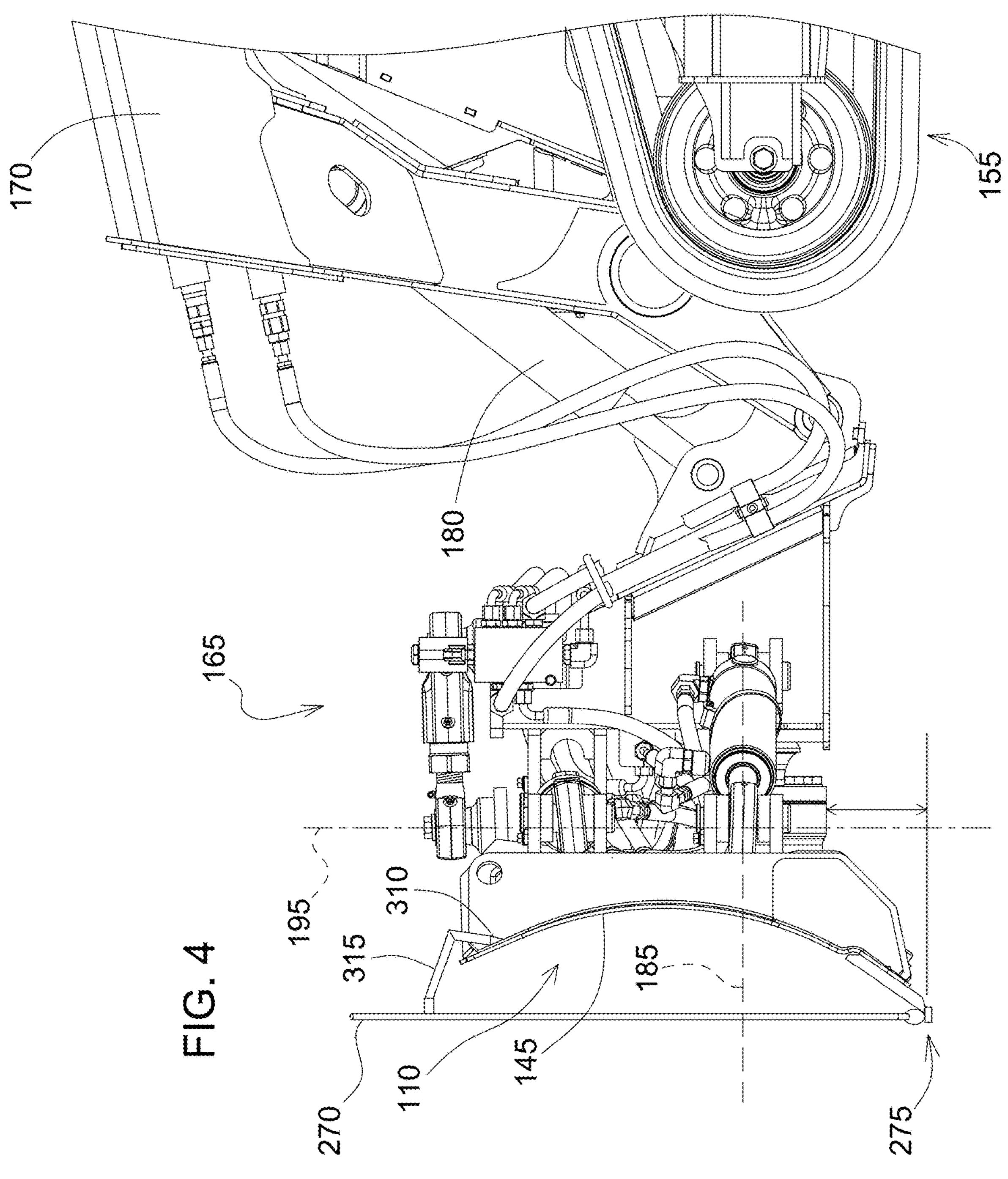
FIG. 4 is a partial side view of the work vehicle of the embodiment of FIG. 1.

The attachment 110 may be operable to engage the ground or surface 130 and grade, cut, and/or move material to achieve simple or complex features on the surface 130. When attached to and operating with a work vehicle 100, the attachment 110 may experience movement in three directions and rotation in three directions. Referring to FIGS. 2 and 4, a direction of the attachment 110 may also be referred to with regard to a longitudinal direction 185, a latitudinal or lateral direction 190, and a vertical direction 195. Rotation for the attachment 110 may be referred to as roll 200 or the roll direction, pitch 205 or the pitch direction, and yaw 210 or the yaw direction. The attachment 110 may be hydraulically actuated to move vertically up and down ("lift"), roll left or right ("tilt"), and yaw left and right ("angle") as described in further detail below.

The attachment 110 is hydraulically coupled to the work vehicle 100 through hoses that couple to an auxiliary hydraulic port on the work vehicle 100. A hydraulic circuit is communicatively coupled to a controller 215 (FIG. 3). The hydraulic circuit includes a hydraulic pump coupled to the pair of boom actuators 175, and the pair of attachment actuators 180 by way of a plurality of flow paths. The hydraulic pump delivers fluid through the plurality of flow paths. The plurality of flow paths are coupled to the pair of boom actuators 175, the pair of attachment actuators 180, and at least one proportional valve. The controller 215 is configured to selectively adjust the at least one proportional valve as a function of an input signal corresponding to a desired attachment 110 configuration. The controller 215 automatically controls the at least one proportional valve to achieve the desired attachment 110 configuration.

The terms "distal", "proximal", "left" and "right" may be used herein to describe certain features of the attachment 110. The terms "distal" and "proximal" are used in relation to the point of view of an operator located on or within the work vehicle 100. For example, a proximal end of the attachment 110 may be the end closest to the operator and the work vehicle 100. A distal end of the attachment 110 may be the end furthest from the operator and the work vehicle 100.

The controller 215 is communicatively coupled to pair of boom actuators 175 and the pair of attachment actuators 180. The controller 215 comprises a data storage device 220 and an electronic data processor 225. As used herein, "controller" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 215 may be in communication with other components on the work vehicle 100, such as hydraulic components, electrical components, and operator inputs within an operator station or cab 230 of an associated work vehicle 100. The controller 215 may be electrically connected to these other components by a wiring harness such that messages, commands, and electrical power may be transmitted between the controller 215 and the other components. Alternatively, the controller 215 may be connected to other components via a network such as a wireless network 235. Although the controller 215 is referenced in the singular, in alternative embodiments the configuration and functionality described herein can be split across multiple devices using techniques known to a person of ordinary skill in the art.

The controller 215 may be embodied as one or multiple digital computers or host machines each having one or more electronic data processors 225, read only memory (ROM), random access memory (RAM), electrically-programmable read only memory (EPROM), optical drives, magnetic drives, etc., a high-speed clock, analog-to-digital (A/D)

circuitry, digital-to-analog (D/A) circuitry, and any required input/output (I/O) circuitry, I/O devices, and communication interfaces, as well as signal conditioning and buffer electronics.

Figure 5:
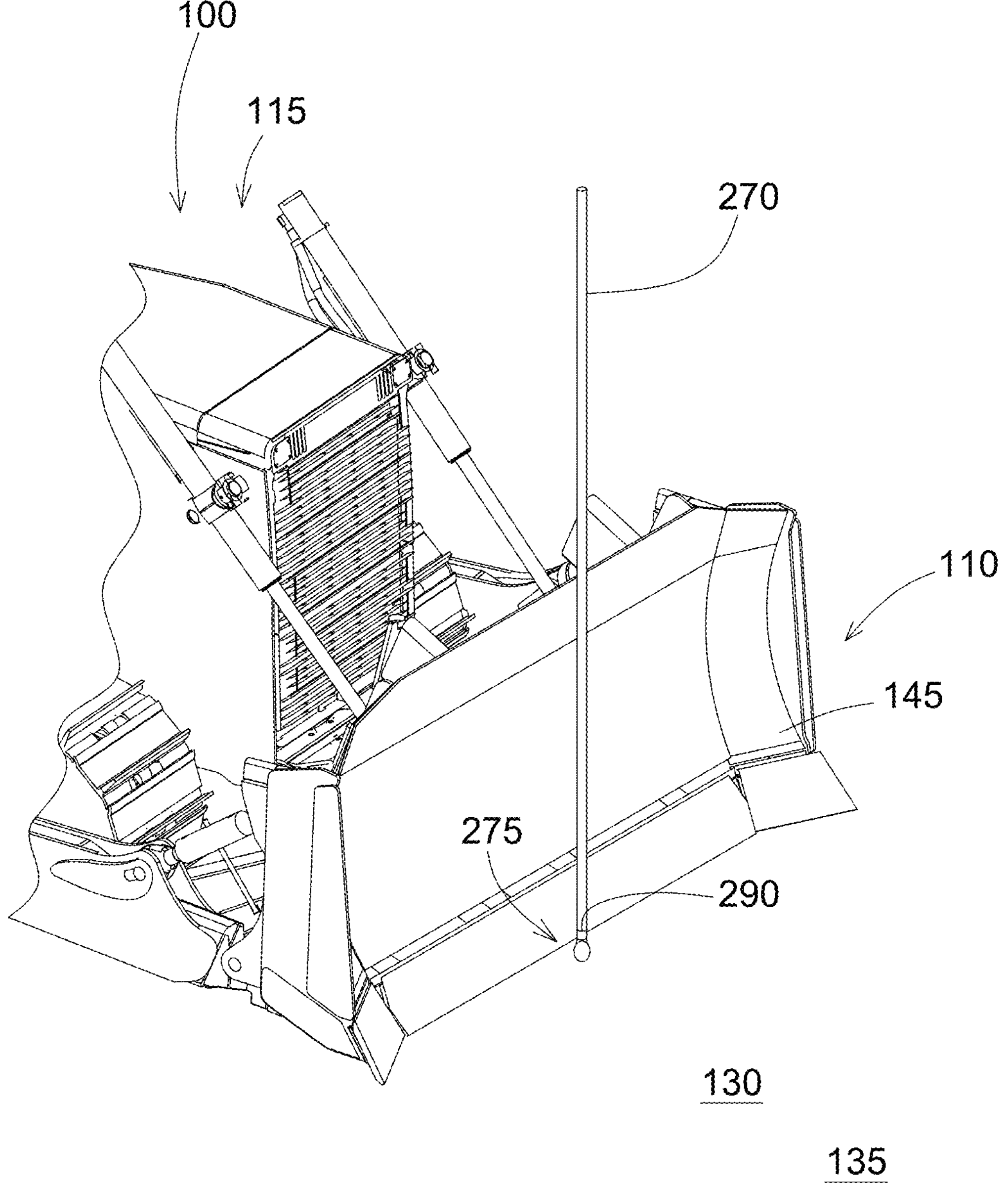
FIG. 5 is a partial perspective view of the work vehicle of the embodiment of FIG. 2.
Figure 6:
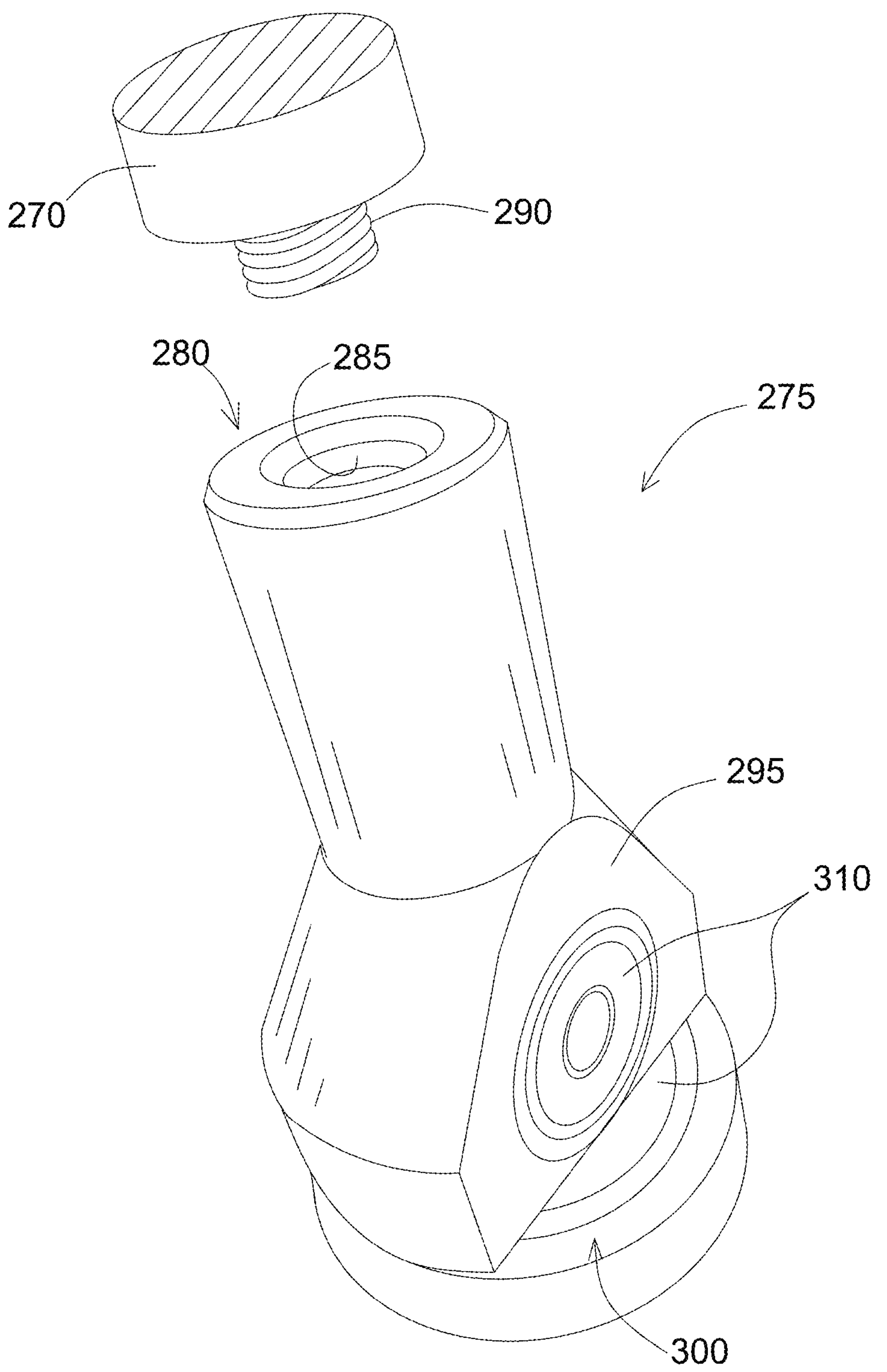
FIG. 6 is a perspective view of a holding device.

A global positioning system or ("GPS") 240 is coupled to the work vehicle 100 and in communication with the controller 215 via the wired connection or the wireless network 235. The GPS 240 is configured for generating a position signal 245 that is used by the controller 215 to execute instructions for the grade control 120 to create a grade control reading 250 indicative of an attachment position 255. The grade control 120 controls the position 125 of the attachment 110 relative to the surface 130 of the worksite 135 to achieve the desired grade 140. The data storage device 220 is configured for storing the instructions for the grade control 120 that are executable by the electronic data processor 225 to cause the electronic data processor 225 to receive the grade control reading 250, receive a rover reading 260 from a rover 265 coupled to a rover pole 270 (FIG. 5) that is secured to the attachment 110 with a holding device 275 (FIG. 6).

The grade control 120 is configured to be calibrated using the rover 265 at the worksite 135. With reference to FIGS. 5 and 6, the holding device 275 has a rover pole receiving portion 280 configured to receive the rover pole 270. The rover pole receiving portion 280 comprises threads 285 and the rover pole 270 comprises mating or matching threads 290 configured to couple the rover pole 270 to the rover pole receiving portion 280 of the holding device 275.

A facing portion 295 of the holding device 275 is positioned on a front or rear of the attachment 110. A bottom portion 300 of the holding device 275 is positioned on a bottom of the attachment 110.

Referring to FIG. 3, the grade control reading 250 is compared to the rover reading 260 by the controller 215 and a corrected reading 305 is generated if the grade control reading 250 and the rover reading 260 are irreconcilable. For example, if the rover reading 260 and the grade control reading 250 are different, the corrected reading 305 might match the grade control reading 250 to the rover reading 260, or the readings might have an offset or other known variation. The corrected reading 305 is configured to reconcile the grade control reading 250 to the rover reading 260 and control the boom actuators 175, the attachment actuators 180, and the attachment 110 at the worksite 135 with the grade control reading 250 configured to accurately calculate the position 125 of the attachment 110 relative to the desired grade 140 of the worksite 135. This may include matching the grade control reading 250 and the rover reading 260. If a corrected reading 305 is not needed because the grade control reading 250 and the rover reading 260 are reconcilable, the work vehicle 100 may be operated with the grade control reading 250 to accurately calculate the position 125 of the attachment 110 relative to the desired grade 140 of the worksite 135.

With reference to FIGS. 4 and 6, a magnet 310 may be coupled to the facing portion 295 of the holding device 275 and/or the bottom portion 300 of the holding device 275. The holding device 275 may be magnetically secured to the attachment 110.

An arm 315 may be removably coupled to the rover pole 270. The arm may have a magnet 310 positioned to secure the rover pole 270 to a top of the attachment 110.

Figure 7:
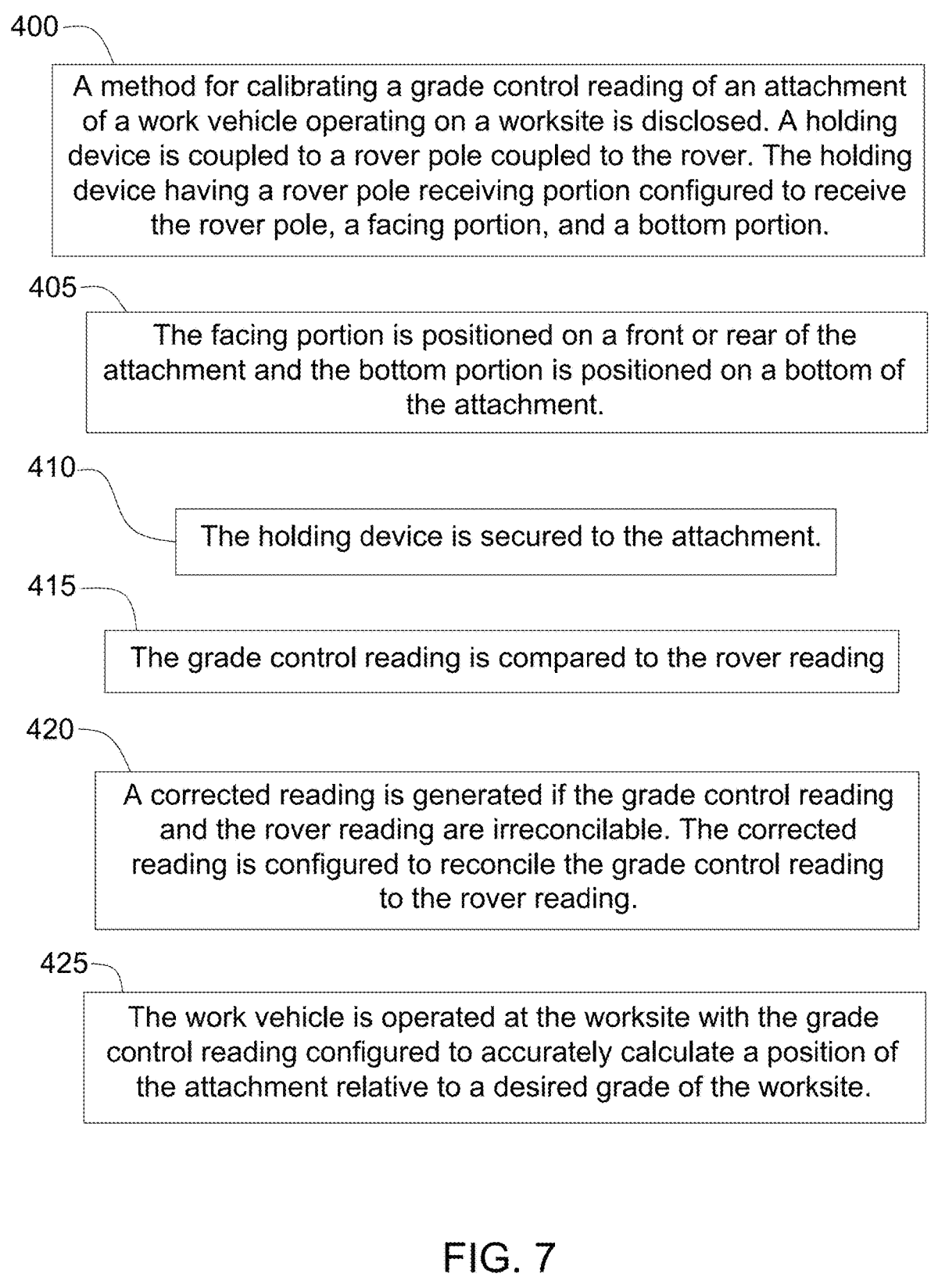

With reference to FIG. 7, a method for calibrating a grade control reading 250 of an attachment 110 of a work vehicle 100 operating on a worksite 135 is disclosed. In step 400, a holding device 275 is coupled to a rover pole 270 coupled to the rover 265. The holding device 275 having a rover pole receiving portion 280 configured to receive the rover pole 270, a facing portion 295, and a bottom portion 300. In step 405, the facing portion 295 is positioned on a front or rear of the attachment 110 and the bottom portion 300 is positioned on a bottom of the attachment 110. In step 410, the holding device 275 is secured to the attachment 110. In step 415, the grade control reading 250 is compared to the rover reading 260. In step 420, a corrected reading 305 is generated if the grade control reading 250 and the rover reading 260 are irreconcilable. The corrected reading 305 is configured to reconcile the grade control reading 250 to the rover reading 260. In step 425, the work vehicle 100 is operated at the worksite 135 with the grade control reading 250 configured to accurately calculate a position 125 of the attachment 110 relative to a desired grade 140 of the worksite 135.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method for calibrating a grade control reading of an attachment of a work vehicle operating on a worksite to a rover reading of a rover at the worksite, the method comprising:

coupling a holding device to a rover pole coupled to the rover, the holding device having a rover pole receiving portion configured to receive the rover pole, a facing portion, and a bottom portion;

positioning the facing portion on a front or rear of the attachment and the bottom portion on a bottom of the attachment;

securing the holding device to the attachment;

comparing the grade control reading to the rover reading;

generating a corrected reading if the grade control reading and the rover reading are irreconcilable, the corrected reading configured to reconcile the grade control reading to the rover reading; and operating the work vehicle at the worksite with the grade control reading configured to accurately calculate a position of the attachment relative to a desired grade of the worksite.

2. The method of claim 1, wherein work vehicle comprises a crawler and the attachment comprises a blade.

3. The method of claim 1, further comprising a magnet coupled to the facing portion of the holding device and a magnet coupled to the bottom portion of the holding device.

4. The method of claim 1, further comprising an arm removably coupled to the rover pole, the arm having a magnet positioned to secure the rover pole to a top of the attachment.

5. The method of claim 1, wherein the holding device is magnetically secured to the attachment.

6. The method of claim 1, wherein the rover pole receiving portion comprises threads and the rover pole comprises matching threads configured to couple the rover pole to the rover pole receiving portion of the holding device.

7. The method of claim 1, further comprising providing a display in the work vehicle to show the corrected reading.

8. A work vehicle for operating on a worksite having grade control configured to be calibrated using a rover, the work vehicle comprising:

a frame supported by a plurality of ground-engaging units, the ground-engaging units configured to support the frame on a surface of the worksite;

an attachment coupler coupled to the frame, the attachment coupler movable relative to the frame by an attachment actuator;

an attachment coupled to the attachment coupler;

a global positioning system coupled to the work vehicle, the global positioning system configured for generating a position signal indicative of an attachment position; and a controller communicatively coupled to the attachment actuator and the global positioning system, the controller comprising a data storage device and an electronic data processor, the data storage device configured for storing instructions that are executable by the electronic data processor to cause the electronic data processor to:

receive the position signal and generate a grade control reading, receive a rover reading from a rover coupled to a rover pole that is secured to the attachment with a holding device, the holding device having a rover pole receiving portion configured to receive the rover pole, a facing portion positioned on a front or rear of the attachment, and a bottom portion positioned on a bottom portion of the attachment, compare the grade control reading to the rover reading, generate a corrected reading to control the work vehicle if the grade control reading and the rover reading are irreconcilable, the corrected reading configured to reconcile the grade control reading with the rover reading, and control the attachment actuator at the worksite with the grade control reading configured to accurately calculate a position of the attachment relative to a desired grade of the worksite.

9. The work vehicle of claim 8, further comprising a boom assembly coupled to the frame, the boom assembly comprising a boom arm pivotally coupled to the frame and movable relative to the frame by a boom actuator, the attachment coupler is coupled to the boom assembly, the controller communicatively coupled to the boom actuator, the controller configured to control the boom actuator at the worksite with the grade control reading matching the rover reading.

10. The work vehicle of claim 8, wherein work vehicle comprises a crawler and the attachment comprises a blade.

11. The work vehicle of claim 8, further comprising a magnet coupled to the facing portion of the holding device.

12. The work vehicle of claim 8, further comprising a magnet coupled to the bottom portion of the holding device.

13. The work vehicle of claim 8, wherein the holding device is magnetically secured to the attachment.

14. The work vehicle of claim 8, wherein the rover pole receiving portion comprises threads and the rover pole comprises matching threads configured to couple the rover pole to the rover pole receiving portion of the holding device.

15. A holding device for holding a rover pole coupled to a rover that provides a rover reading for calibrating a grade control reading indicative of a position of an attachment of a work vehicle operating on a worksite, the holding device comprising:

a rover pole receiving portion configured to receive the rover pole, a facing portion positioned on a front or rear of the attachment, and a bottom portion positioned on a bottom portion of the attachment, the holding device configured to secure the rover pole to the attachment.

16. The holding device of claim 15, further comprising a magnet coupled to the facing portion of the holding device.

17. The holding device of claim 15, further comprising a magnet coupled to the bottom portion of the holding device.

18. The holding device of claim 15, wherein the holding device is magnetically secured to the attachment.

19. The holding device of claim 15, wherein the rover pole receiving portion comprises threads and the rover pole comprises matching threads configured to couple the rover pole to the rover pole receiving portion of the holding device.

20. The holding device of claim 15, further comprising a magnet coupled to the facing portion of the holding device and a magnet coupled to the bottom portion of the holding device.

* * * * *